March 13, 1973   A. MICHELSON   3,720,127
METHOD AND APPARATUS FOR PRESS WORKING
Filed May 14, 1971   4 Sheets-Sheet 1

INVENTOR.
ANATOL MICHELSON
BY
Meyer, Tilberry & Body
ATTORNEYS

INVENTOR.
ANATOL MICHELSON
BY
Meyer, Tilberry & Body
ATTORNEYS

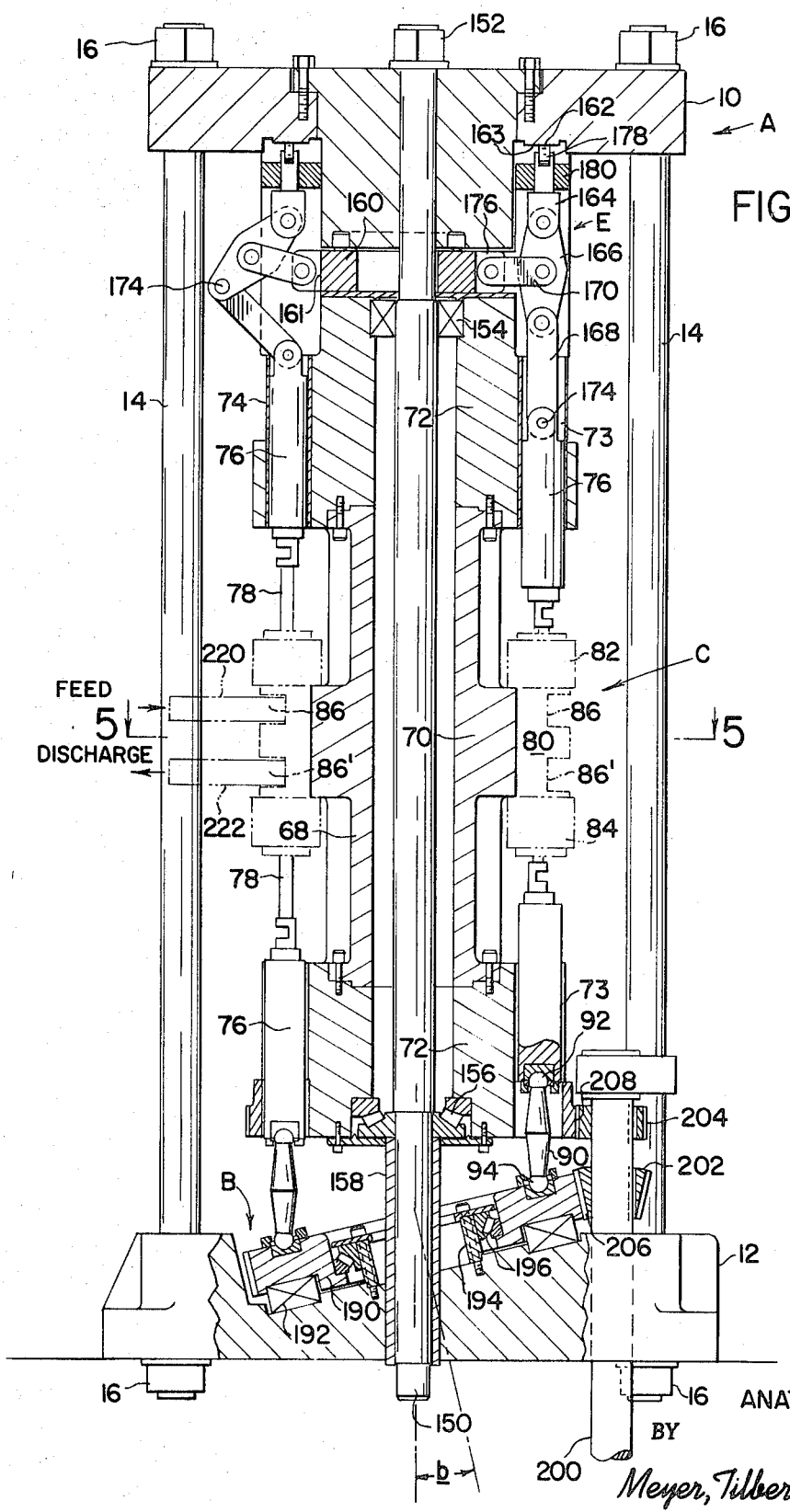

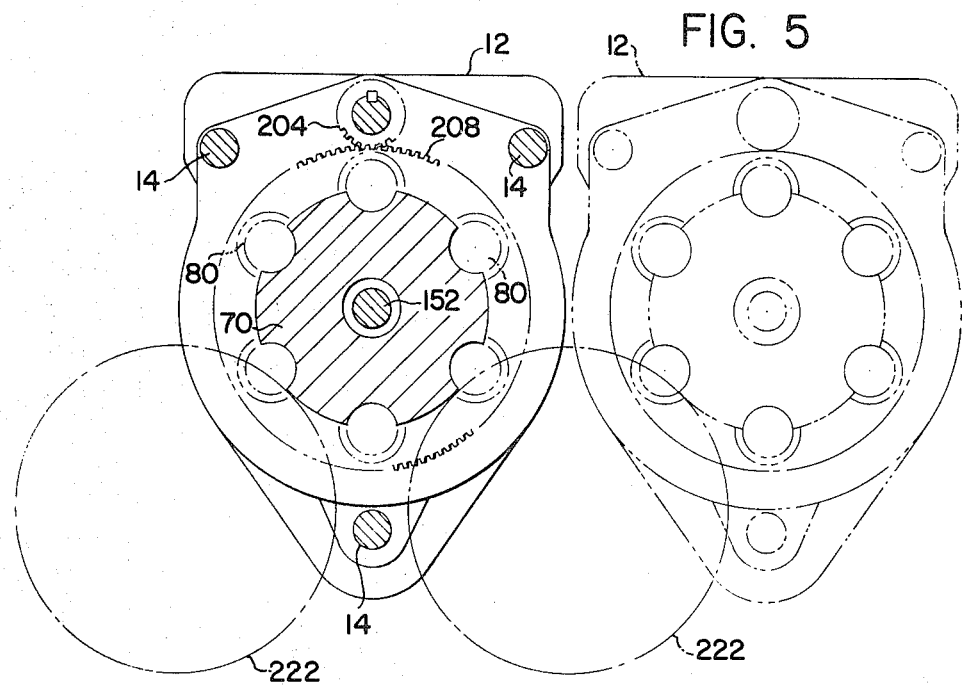
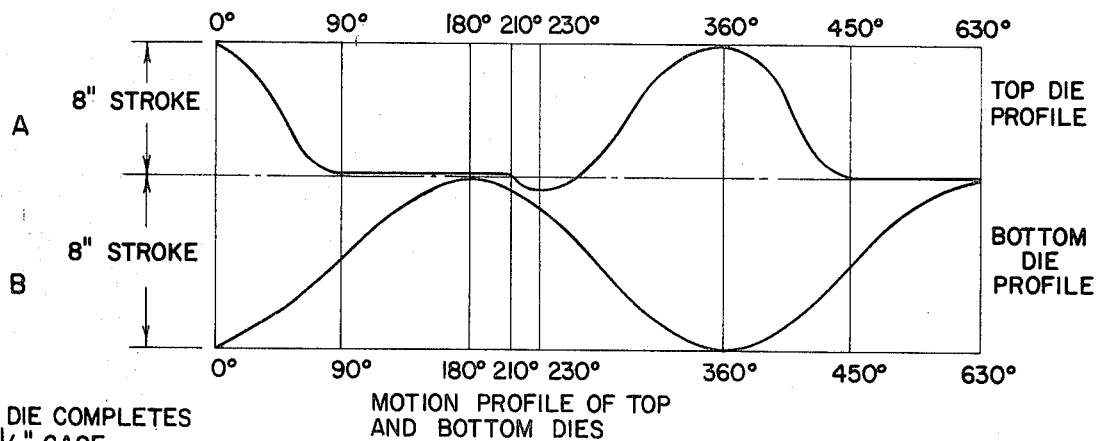
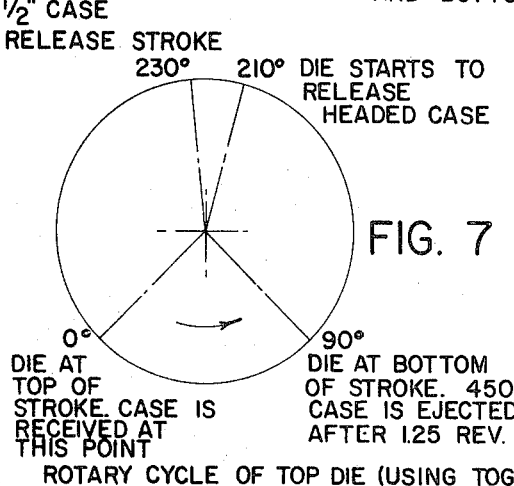
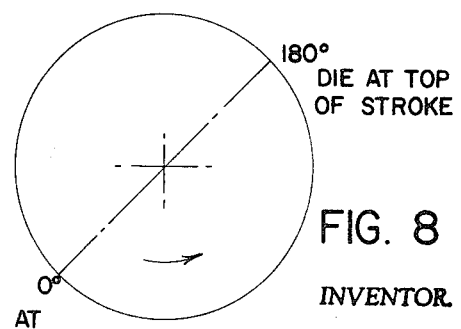

United States Patent Office 3,720,127
Patented Mar. 13, 1973

3,720,127
METHOD AND APPARATUS FOR PRESS WORKING
Anatol Michelson, Swarthmore, Pa., assignor to Gulf + Western Industrial Products Company, Grand Rapids, Mich.
Filed May 14, 1971, Ser. No. 143,582
Int. Cl. B26d 5/08
U.S. Cl. 83—550                                         11 Claims

ABSTRACT OF THE DISCLOSURE

A method and apparatus for successively performing a press-type operation of a plurality of workpieces located in work stations which are arranged in a circle. Tool means rotatable in unison with the work stations are forcibly reciprocated by drive means into and out of engagement with the work stations during each revolution thereof. Unprocessed workpieces are fed into the work stations as the processed workpieces are removed therefrom during each revolution.

---

This application pertains to the art of press working and more particularly to a swash-toggle rotary press.

The invention is particularly applicable to successively performing a press working operation on a plurality of small workpieces such as cartridge cases and will be described with particular reference thereto; however, it will be appreciated that the invention has broader applications and may be employed for other applications where it is desirous to perform a press operation on a plurality of small workpieces.

Heretofore, conventional mechanical presses have been utilized in the manufacture of small metal workpieces. The primary drawback in using this type of press has been that there is a relatively low production output. This is primarily due to the fact that during each press stroke only one workpiece was processed and the size of the press necessarily dictated a low number of press strokes per minute. Even though some small standard mechanical presses do in fact have a relatively high number of strokes per minute their output capabilities were limited by the difficulty in properly feeding and removing the workpieces in a fast and efficient manner in the tools and dies located within the press beds.

It has previously been suggested to utilize cam operated rotary presses having a plurality of work stations thereon. When only small work forces, that is, up to a few tons, were involved, the wear on the cams and cam followers was reasonably small and the size of the main press parts required was not excessive. However, when work forces were required in the range of tens or hundreds of tons, the wear on the cams and cam followers was significantly higher and the press component parts were of necessity required to be extremely large. These problems therefore rendered the prior rotary presses impractical for high force applications from a production standpoint in that they only permitted high productivity rates when low force requirements were present.

The present invention contemplates a new and improved method and apparatus which overcomes all of the above referred problems and others, and provides a new method and apparatus for press working of small workpieces which is simple, economical, and provides high production rates to be attained when high force requirements are involved.

In accordance with the present invention, there is provided a new rotary press comprised of an elongated rotor shaft having a longitudinal axis and means for defining a plurality of work stations arranged generally in a circle around the shaft. These work stations include means for retaining workpieces therein in a desired oriented position. A plurality of first tool means for performing the work function are also arranged in a circle around the shaft and extend generally parallel therewith for successive reciprocation between a first position spaced from one of the work stations and a second position in a work performing relationship therewith. Means for successively forcing the tool means between the first and second positions are provided for when the work stations and tool means are rotated in unison about the longitudinal axis of the rotor shaft.

In accordance with another aspect of the present invention, the means for forcing includes an element disposed adjacent one end of the rotor shaft in communication with each first tool means, which element is disposed at a preselected angle relative to the rotor shaft. The element is also rotated in unison with the work stations and tool means whereby the tool means is driven between the first and second positions.

In accordance with another aspect of the present invention, a plurality of second tool means are provided. Each of the second tool means is coaxially positioned relative to a first tool means for opposed reciprocation between the first and second position with the associated first tool means. A second element, parallel to the first element and positioned adjacent the other end of the rotor shaft therefrom, is provided for driving the plurality of second tool means between the first and second positions. This second element is also rotatable in unison with the other components.

In accordance with still another aspect of the present invention, the second element is stationarily positioned adjacent the other end of the rotor shaft and coaxial therewith. The second element also includes a cam surface thereon to drive the second tool means successively between the first and second positions.

In accordance with still another aspect of the present invention, there is provided a new method of press working particularly useful for small workpieces which comprises the steps of:

(a) Rotating a plurality of work stations each containing a workpiece about an axis in a generally circular path;

(b) Rotating a plurality of tool means about the same axis in unision with the work station; and (c) Forcing each of the tool means between a first position spaced from one of the work stations and a second position in a work relationship therewith during each rotation of the work stations and tool means.

In accordance with yet another aspect of the present invention, the new method for press working further includes the step of providing two sets of the tool means for opposed coaxial reciprocation on each side of the work stations.

The principal object of the present invention is the provision of a new and improved method and apparatus for press working of small workpieces.

Another object of the present invention is the provision of a new and improved method and apparatus for press working small workpieces which increases productivity.

Another object of the present invention is the provision of a new and improved method and apparatus for press working small workpieces which permits the transmission of large work forces without the need for heavy load supporting apparatus components.

Another object of the present invention is the provision of a new and improved method and apparatus for press working of small workpieces which permits versatility in use.

Still another object of the present invention is the provision of a new and improved method and apparatus for press working of small workpieces which facilitates combinations with other mechanical working and handling equipment.

Yet another object of the present invention is the provision of a method and apparatus for press working of small workpieces which is economical to use.

The invention may take physical form in certain parts and arrangements of parts, preferred embodiments of which will be described in detail in this specification and illustrated in the accompanying drawings which form a part hereof and wherein:

FIG. 4 is a second embodiment of a rotary press using the concepts of the subject invention;

FIG. 5 is a cross sectional view of the rotary press shown in FIG. 4 taken along lines 5—5 and showing a second rotary press adjacent thereto;

FIG. 6 is a motion profile of the rotary press shown in FIG. 4;

FIG. 7 is a cyclogram of the toggle portion of the rotary press shown in FIG. 4; and FIG. 8 is a cyclogram of the tool means in the rotary press shown in FIG. 1 and the tool means in the bottom portion of the rotary press shown in FIG. 4.

Figure 1:
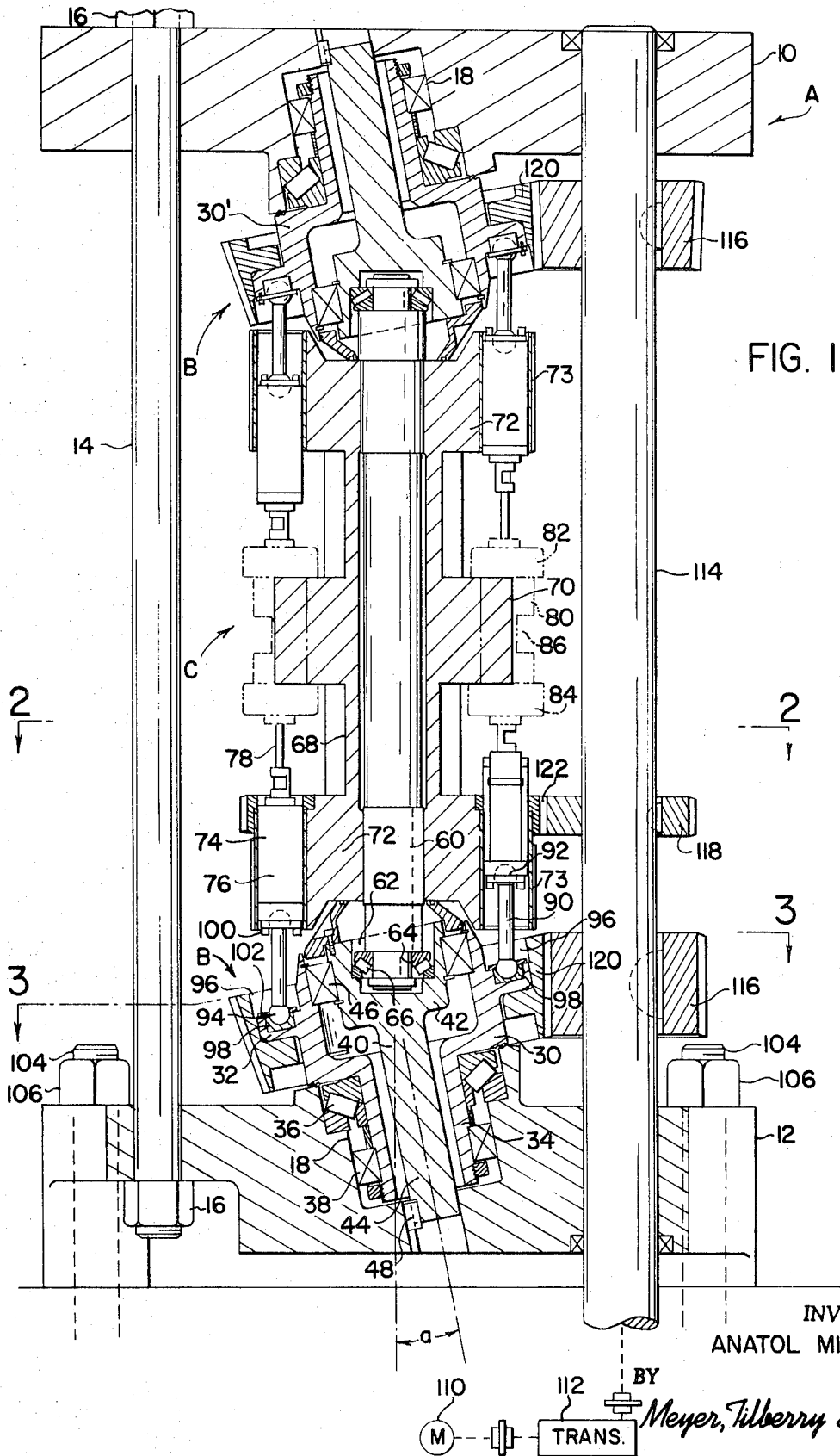
FIG. 1 is a cross sectional view of a rotary press using the concepts of the subject invention.

Referring now to the drawings, wherein the showings are for the purposes of illustrating the preferred embodiments of the invention only and not for purposes of limiting same, FIG. 1 shows a rotary press having frame assembly A, swash disc assemblies B, rotor assemblies C, and drive means D.

More specifically, frame assembly A is comprised of a heavy top frame plate 10 and a heavy bottom frame plate 12 interconnected with a plurality of tie rods 14 and tie rod bolts 16. Frame plates 10, 12 each have a receiving opening 18 therein which is adapted to angularly receive a swash disc assembly as hereinafter more fully described.

Although there are two swash disc assemblies in the press shown in FIG. 1, description will hereinafter be made with reference to one of these assemblies, it being understood that the other assembly is identical thereto unless otherwise specifically noted. Swash disc assembly B is comprised of a generally bell-shaped element or swash disc 30 having a larger diameter upper portion 32 and a smaller diameter lower portion 34. Swash disc 30 is received in receiving opening 18 and supported and positioned by bearing sets 36, 38. It should be noted that these bearing sets may be comprised of any of a number of types of bearings which are commonly used in heavy rotating apparatus. Specifically, bearing set 36 is spaced immediately adjacent the area connecting upper portion 32 and lower portion 34 in communication with opening 18 and bearing set 38, also in communication with opening 18, primarily aligns the swash disc in the opening by being closely received against lower portion 34. Received inside swash disc 30 and in a spaced relationship therewith is stationary support 40. The stationary support includes a larger diameter upper end 42 and a smaller diameter lower end 44 generally corresponding to portions 32, 34, respectively. Stationary support 40 is retained in a stationary position relative swash disc 30 and opening 18 by key 48 cooperating with opening 18 in a manner well known.

Spaced between swash disc 30 and the corresponding swash disc 30' is rotor shaft 60 received in shaft receiving opening 62 in stationary support 40. It should be here noted that the axes of swash discs 30, 30' are received in frame plates 10, 12 at a preselected angle relative to rotor shaft 60. This angle is generally between 5–25° as will be more fully set forth hereinafter relative to operation of the press. The rotor shaft includes a necked down portion 64 at each end thereof for engagement with a shaft support bearing 66 received in opening 62. Spaced around rotor shaft 60 in close proximity therewith is a rotor body generally designated 68 and including work station areas 70 and two identical tool supporting and guiding areas 72. In the preferred embodiment, each tool supporting and guiding area includes six through-holes 73 therein generally parallel with rotor shaft 60, and each adapted to receive a tool means 74. Each tool means 74 is comprised of a slide portion 76 dimensioned so as to be closely received in its associated hole 73 for a sliding relationship therewith. In addition to the slide portion, each tool means includes a tool portion 78 extending towards work station area 70. The specific design of tool portion 78 does not form a part of the present invention, it being understood that it may be any type of tool required for performing a particular press-type work function, such as for example, a punch for performing a punching operation.

Work station areas 70, in the preferred embodiment, each include six tool container receiving recesses 79 extending therethrough, each recess 79 being generally coaxial with one of through holes 73. Each recess 79 is adapted to receive a tool container 80 comprised of end portions 82, 84 and a side opening 86 therein. End portions 82, 84 include tool portion receiving areas (not shown) therein to mate with one of tool portions 78 in order to provide a working relationship similar to those in other press working operations. For example, tool portions 78 could be punches for performing a punching operation and the tool containers could contain the female portions of a punching die. Opening 86 provides means whereby workpieces may be inserted and removed from the press. As the specific tool container concept does not form a part of the present invention, it is not more fully described or shown.

Spaced between the end of each slide portion 76 and upper portion 32 of swash disc 30 is a link or rod 90 having generally spherical ends 92, 94. These spherical ends greatly reduce contact stresses between the contacting surfaces. Swash disc 30 includes a plurality of link receiving recesses 96 therein (FIG. 3) having a support material 98 at the bottom thereof. Keepers 100, 102 maintain spherical ends 92, 94 in position with slide portions 76 and recesses 96, respectively.

To mount the above described press in position, there are provided a plurality of elongated press mounting bolts 104 and tightening nuts 106 in order that the press may be secured to, for example, a floor as is known in the press art.

In order to simultaneously rotate swash disc assemblies A and rotor assembly C about the longitudinal axis of the press, there is provided a motor generally designated 110 which, by means of known gears and gear boxes generally designated 112 rotate drive shaft 114 which is mounted for rotation between frame plates 10, 12. Mounted to shaft 114 by conventional means, such as for example, keys and mating keyways, are drive gears 116 and drive gear 118. As can best be seen in FIGS. 1, 2 and 3, one of gears 116 is associated with each swash disc assembly A and gear 118 is associated with rotor assembly B. Swash discs 30, 30' each include therearound a gear 120 for mating engagement with gears 116. Likewise, the lower tool supporting and guiding area 72 has spaced about the outside thereof a gear 122 for mating engagement with driving gear 116.

As swash disc assemblies A are angled relative to the longitudinal axis of the press as hereinabove described, they cause each tool means to be reciprocated between a first position spaced from a working relationship with its associated tool container and a second position in a working relationship therewith during rotation of the swash disc and rotor assemblies. The amount of angle $a$ as shown in FIG. 1 is determined by simple trigonometric calculations when the diameter between work station areas 70 and the required stroke of each tool means 74 is known. As can be seen in FIG. 1, and as the 11 upper and lower tool means are coaxially aligned with each other, the associated tool means move in the same direction such that when the upper tool means is spaced from its associated tool container in the first position, the lower tool means will be in the second position in a working relationship therewith.

Workpieces may be fed into and removed from tool containers 80 at each side of the press in the view shown in FIG. 1 where, in that position, either the top or bottom tool means is in its first position. As the press components are rotated, each tool means is reciprocated through one vertical press stroke similar to any other mechanical press. The productivity of the press itself is simply determined by multiplying the number of tool sets, in the preferred embodiment that being 12, by the number of revolutions of the rotor and swash assemblies per minute. FIG. 8 pictorially demonstrates the relationship of each tool means during one revolution thereof and similarly, FIG. 6, graph B shows the motion profile for each tool means of the embodiment of the invention shown in FIG. 1 through one and a half revolutions.

A second embodiment of a press including the concepts of the subject invention is shown in FIGS. 4 and 5. Like components of each of these embodiments are shown with like numerals, different components generally being designated with new numerals.

In this second embodiment, rotor shaft 150 extends between upper and lower frame plates 10, 12 and is secured in that position by a nut 152. Rotor body 68 is again comprised of work station area 70 and tool supporting and guiding areas 72. In this embodiment, supporting and guiding areas 72 and work station area 70 are individual components and are fastened together as an integral rotor body. Rotor body 68 is received around shaft 150 and supported for rotation thereabout by bearing sets 154, 156. Further, a rotor assembly support 158 is received about rotor shaft 150 in communcation with the bottom of rotor body 68. As in the embodiment described with reference to FIG. 1, the tool means disposed in tool supporting and guiding areas 72 and the tool containers disposed in work station area 70 are coaxial. Further, there are again six tool means disposed in each supporting and guiding area 72 and six tool containers disposed in work station area 70, although it should again be appreciated that a greater or lesser number could be used.

Figure 2:
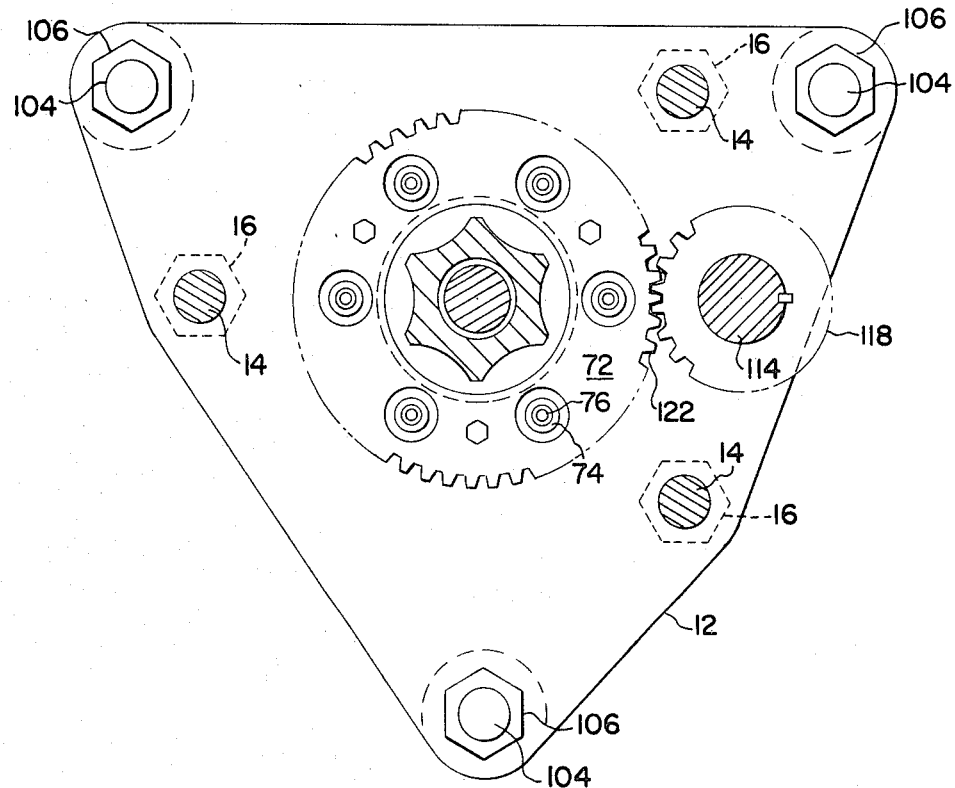
FIG. 2 is a cross sectional view of the rotary press shown in FIG. 1 taken along lines 2—2.
Figure 3:
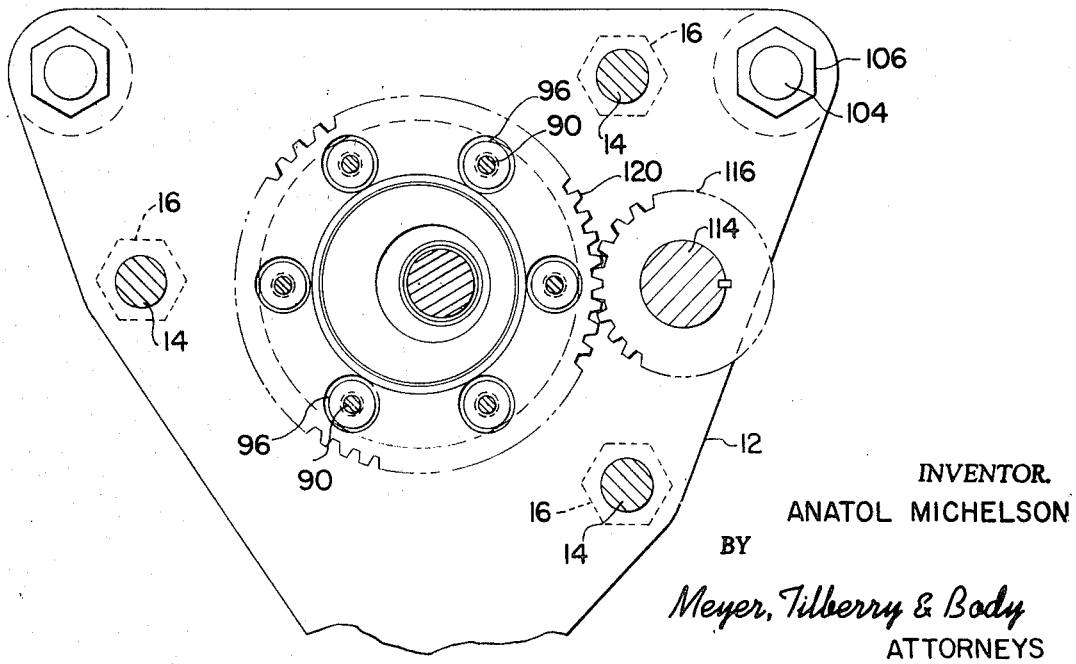
FIG. 3 is a cross sectional view of the rotary press shown in FIG. 1 taken along lines 3—3.

Unlike the embodiment shown in FIGS. 1, 2 and 3, the present embodiment includes a toggle drive mechanism for the upper tool means. It should briefly be noted that the tool means 74 in this embodiment are identical to and similarly located as tool means 74 in the embodiment shown in FIG. 1 such that further description relative to this aspect of the invention is therefore not included. Spaced on the bottom side of upper frame plate 10 between frame plate 10 and the upper tool supporting and guiding areas 72 is a stationary cam 160 having a circumferentially extending cam surface 161. Further, a second stationary cam 162 having cam surface 163 is spaced around the bottom edge of upper frame plate 10, cam 162 circumscribing shaft 150. Interconnecting each slide portion 76 for purposes of driving the tool means are a holder 164, a constraining link 166, a tool means link 168, a connecting link 170 and a plurality of pivot joints 174 of the type which are common in press usage. Links 166, 168 and 170 form in combination a toggle type linkage. Pivotally interconnected with all of the tool means linkage combinations is a wobble ring hub 176 which acts as a cam follower against cam surface 161 during press operation. Likewise, each tool means linkage combination includes a cam follower 178 pivotally mounted to holder 164 for engagement with stationary cam 162. A retaining ring 180 is disposed about holder 164 between the holders and cam followers 178 to retain these components in a desired position relative to the press. As rotor body 68 is rotated about shaft 150, wobble ring hub 176 and cam followers 178, responding to engagement with the cam surfaces 161, 163 of stationary cams 160, 162 respectively drive each tool means 74 between a first position spaced from an operative relationship with the assoociated tool container 80 and a second position spaced in an operative relationship therewith.

The tool means associated with the lower tool supporting and guiding areas 72 are driven by an element or swash disc similar to that as hereinabove described relative to the first embodiment. In this embodiment, the swash disc 190 is angularly disposed in bottom frame plate 12 at an angle $b$ relative to rotor shaft 150. Again, this angle is generally between the range of 5–25° and is determined as hereinabove described. The swash disc is supported in bottom frame plate 12 by bearings 192 of the type satisfactory for press use. A swash disc centering portion 194 is rigidly affixed to bottom frame plate 12 and locates swash disc 190 by means of assembly 196 extending therebetween. The tool means 74 associated with the lower tool supporting and guiding areas 72 are again forced into and out of engagement with tool container 80 by means of links or rods 90 is in the first embodiment.

A drive shaft 200, rotatably driven by external means which do not form a part of the present invention, includes thereon drive gears 202 and 204. Gear 202 matingly engages a gear 206 extending circumferentially about the outside of element or swash disc 190 and drive gear 204 engages a gear 208 extending circumferentially around the lower of the tool supporting and guiding area 72. As may be seen in FIG. 4, rotating the swash disc assembly and rotor assembly effects reciprocal movement of each of the tool means 74 associated with the lower tool supporting and guiding area 72.

The rotary press shown in FIG. 4 is particularly adapted for use in forming cartridge cases and the operation thereof will now be explained with particular reference to heading such a cartridge case. For this operation, cases are individually fed into feed openings 86 of tool containers 80 by means of feed transfer discs 220 which is not described in detail as it does not form a part of the present invention. It is to be understood that other means such as a conveyor belt or hand feeding could also be utilized. As the rotor assembly and swash disc assembly are rotated from the feed and discharge area shown in FIG. 4, and with reference to only one pair of associated tool means 74 and tool container 80, stationary cam 160 begins to direct the upper tool means in a downward direction toward engagement with tool container 80 and swash disc 190 directs the lower tool means 74 in an upward direction through link 90 also toward tool container 80. As is best seen in FIG. 6, graphs A and B thereof, the toggle linkage and cam and cam follower arrangement are such that the tool means 74 associated therewith travels through its stroke into an operative relationship with tool container 80 faster than does the lower associated tool means. As tool portion 78 engages tool container 80, it receives the cartridge which has been carried into opening 86 by feed disc 220. As this cartridge case and the tool portion pass further into tool container 80, they engage a die disposed between feed opening 86 and a discharge opening 86' and eject the previously processed cartridge case therefrom into a discharge transfer disc 222. Disc 222 may be similar to disc 220 and does not itself form a part of the present invention. The discharge disc then removes the cartridge case from the press area for further processing.

At this point, and with reference to FIGS. 6 and 7, it will be seen that the press will have rotated through approximately 90° of one rotation and the upper tool means is in its lower-most position. It should be noted that links 166, 168 are generally vertically aligned with the tool as shown in the right-hand side of FIG. 4. In this position, any force applied against the tool means will be received by holder 164, links 166, 168 and retaining ring 180, not by cams 160, 162, wobble ring hub 176 and cam follower 178. Cam 160 is so designed that the tool means associated therewith remains in its lower-most position from approximately 90° of the cycle through 210° of the cycle. During this same period of cycle, the corresponding tool means associated with the swash disc enters tool container 80 until it strikes, i.e., heads, the cartridge case at approximately 180° of one cycle. Following this heading, this tool means is again retracted to its lower-most position at the end of one complete cycle. This travel may be seen from graph B of FIG. 6 and FIG. 8.

Following heading, and with specific reference to graph A of FIG. 6 and FIG. 7, the upper or toggle operated tool means dwells in the lower-most position until approximately 210° of one cycle and then is retracted by the inneraction of cam surface 161 against wobble ring hub 176 to its upper-most position by the end of one full press cycle. At approximately 230° of one complete cycle, tool portion 78 is released from the cartridge case which remains in the die area for rejection by the next cartridge case to be processed in a manner identical to that hereinabove described.

It is to be understood that each of the six interrelated upper and lower tool means functions identical with the one as hereinabove described and that a greater or lesser number of these corresponding tool means may be utilized depending on workpiece configuration, size and production requirements. Further, it will be understood by those skilled in the art that the configuration of cam surface 161 of cam 160 may be altered as well as the spacial relationships between links 166, 168 and 170 in order to obtain other motion profiles while performing other work on different types of workpieces. Similarly, tool portions 78 of tool means 74 may comprise any type of tool commonly used in press working with their associated mating tools in tool container 80.

The invention has been described with reference to preferred embodiments. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A rotary press for press working a plurality of workpieces, said press comprising:
an elongated rotor shaft having a first longitudinal axis and a first and second end;
means for defining a plurality of work stations arranged generally in a circle around said shaft, said work stations including means for retaining a workpiece therein in a desired oriented position;
a plurality of first tool means for performing said press working, said first tool means arranged generally in a circle around said shaft and extending generally parallel therewith, each of said first tool means being disposed coaxial with one of said work stations and mounted to reciprocate along a tool axis;
means adjacent said first end of said rotor shaft for successively forcing each of said first tool means between a first position spaced from its associated work station and a second position in a work-performing relationship with its associated work station, said force means including a first element mounted to rotate about a second longitudinal axis, a series of first tool driving devices symmetrically disposed around said second axis and first means for connecting each of said first driving devices with one of said first tool means, said first and second axes intersecting each other at a predetermined angle, whereby rotation of said rotor shaft and said work stations about said first axis causes said first driving devices to reciprocate said first tool means along said tool axes generally parallel to said first axis; and,
means for rotating said work stations and said first tool means in unison about said first axis.

2. The rotary press as defined in claim 1 including means for rotating said element about said second axis in unison with said work stations and said tool means.

3. The rotary press as defined in claim 2 further including a second element adjacent said second end of said rotor shaft mounted to rotate about a third longitudinal axis generally parallel with said second axis and intersecting said first axis at said preselected angle; a plurality of second tool means including means for mounting each of said second tool means to reciprocate along the tool axis of one of said first tool means and to rotate in unison therewith, said second element having a series of second tool driving devices and second means for connecting each of said second tool driving devices to one of said second tool means; and, means for rotating said second element in unison with said work stations, said first and second tool means and said first element, whereby during said rotation the associated of said first and second tool means are oppositely driven between said first and second positions.

4. The rotary press as defined in claim 3 wherein said first and second connecting means each comprises connecting rod members, each of said connecting rod member disposed intermediate its associated element and tool means.

5. The rotary press as defined in claim 3 including guide means for guiding each of said first and second tool means between said first and second positions, said work station defining means further being integral therewith.

6. The rotary press as defined in claim 5 wherein said work station defining means comprises a plurality of tool containers including means for retaining said workpieces in said desired oriented relationship and cooperating with said first and second tool means in performing said press working.

7. The rotary press as defined in claim 2 further including a second element adjacent said second end of said rotor shaft coaxially disposed about said rotor shaft; a plurality of second tool means including means for mounting each of said second tool means to reciprocate along the tool axis of one of said first tool means and to rotate in unison therewith, said second element having a series of second tool driving devices and second means for connecting each of said second tool driving means to one of said second tool means; and, means for maintaining said second element in a stationary position relative to said press during rotation in unison of said work stations, said first and second tool means and said first element.

8. The rotary press as defined in claim 7 wherein said second element comprises a stationary cam member including a cam surface thereon for engagement with each of said second connecting means during said rotation.

9. The rotary press as defined in claim 8 wherein each said second connecting means comprises a toggle linkage including a constraining link, a tool means link and a connecting link, said connecting link cooperating with said cam member to drive the associated second tool means through said tool means link and said constraining link between said first and second positions during said rotation.

10. The rotary press as defined in claim 7 including guide means for guiding each of said first and second tool means between said first and second positions, said work station defining means further being integral therewith.

11. The rotary press as defined in claim 10 wherein said work station defining means comprises a plurality of tool containers including means for retaining said workpieces in said desired oriented relationship and cooperating with said first and second tool means in performing said press working.

References Cited
UNITED STATES PATENTS

| | | | |
|---|---|---|---|
| 2,802,526 | 8/1957 | Hillman | 10—72 R X |
| 1,940,883 | 12/1933 | Rollings | 83—552 |
| 3,160,046 | 12/1964 | Bredow | 83—552 X |

GIL WEIDENFELD, Primary Examiner

U.S. Cl. X.R.

83—519, 552, 563, 618